J. JOWITT.
Holders for Articles while being ground.
No. 195,930. Patented Oct. 9, 1877.
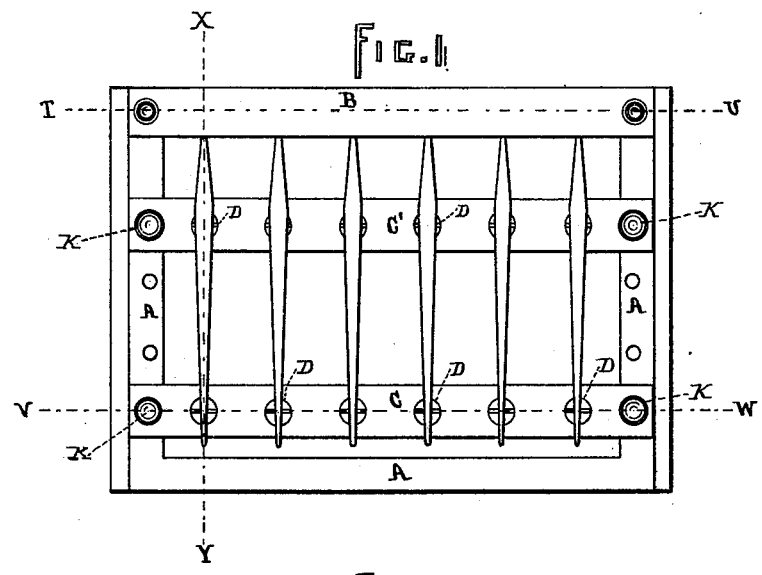
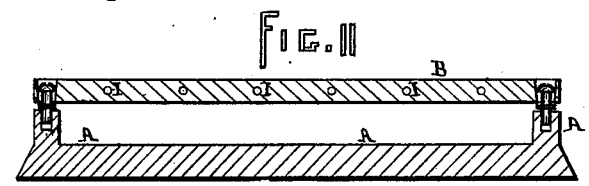
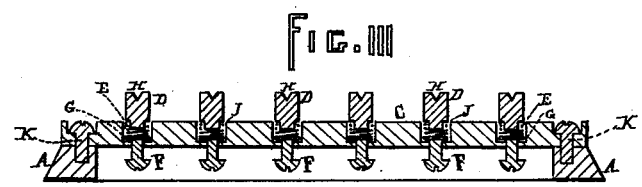
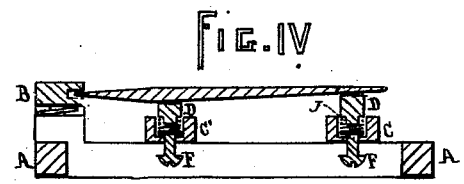
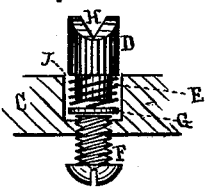
Witnesses  Fig. V  Inventor
Albert E. Gacharls,  James Jowitt,
George E. Buckley

UNITED STATES PATENT OFFICE.

JAMES JOWITT, OF PHILADELPHIA, PENNSYLVANIA, ASSIGNOR TO GEORGE BARNETT AND HENRY BARNETT, OF SAME PLACE.

IMPROVEMENT IN HOLDERS FOR ARTICLES WHILE BEING GROUND.

Specification forming part of Letters Patent No. 195,930, dated October 9, 1877; application filed August 28, 1877.

*To all whom it may concern:*

Be it known that I, JAMES JOWITT, of Philadelphia, State of Pennsylvania, have invented certain new and useful Improvements in Holders for Grinding-Machines; and I do hereby declare the following to be a full, clear, and exact description of the same, reference being had to the annexed drawings, making part hereof.

My invention consists, in a holder for grinding-machines, of the combination, with each of the movable lugs which sustain the blanks, of a spiral spring set behind each lug to raise the lugs and to force the blanks, by a yielding pressure, against the face of the stone, and a set-screw, F, operating to vary the tension of the spring; also, in a holder for grinding-machines, the combination of cross-bars, lugs sustained by said cross-bars and upon which the blanks rest, and a frame to sustain said cross-bars, the said frame having a number of holes into which pins from the cross-bars set, whereby the latter are adjustable to grind blanks of various lengths.

To enable others skilled in the art to make and use my invention, I will describe its construction and operation.

In the drawings, Figure I is a plan view of my device; Fig. II, a longitudinal sectional view of the bar which receives the tines of the file-blanks, and which is also mounted upon spiral springs on line T U of Fig. I; Fig. III, a longitudinal view of a cross-bar which sustains the article being ground, and shows the lugs, springs, and the set-screws below each, on line V W of Fig. I; Fig. IV, a cross-sectional view of the bar to receive the tines and the two cross-bars and frame, showing also a file-blank in position to be ground, on line X Y of Fig. I; Fig. V, a detached view of a section of a cross-bar, showing an enlarged view of the lug, spiral spring, set-screw, and the flat disk or plate between the spring and screw.

The device here shown is that frame of a grinding-machine which sustains the articles to be ground against the face of the revolving stone.

A is the frame; B, the back cross-bar, filled with sockets or depressions I to receive the tines of the file-blanks being ground; C C', the cross-bars which sustain the lugs D; E, the spiral springs; F, the set-screws; G, Fig. V, flat plates or disks between the set-screws and the springs, to communicate the pressure of the screws to the springs. H are grooves in the tops of lugs D, in which the articles to be ground rest. I are the sockets or depressions in bar B, to receive the ends or tines of the file-blanks.

The cross-bars C have round sockets J sunk in them, as shown in Figs. III, IV, and V, to receive the lugs D and springs E, and these sockets have screw-threaded openings pierced through to the bottom of the bar, to receive set-screws F. A round plate, G, is first set in this socket; the spiral spring E is then dropped upon this plate. The lugs D are each made with a small lower end and a shoulder. When they are inserted the small end drops into the middle of the spring, and the lug rests upon the upper round edge of the spring by its shoulder. The set-screw F is then screwed into the threaded opening of the socket, and by screwing up it raises the plate G and consequently increases the pressure of the spring upon the lug, tending to raise the latter up.

The groove or depression H can be of any shape to receive the object to be ground. Lugs differently grooved in this particular can be kept on hand, and may be substituted one set for another by simply lifting one set out of the sockets, leaving the springs there, and inserting the other set.

In grinding file-blanks as well as other articles it will sometimes be found that various sets of blanks are of various sizes, and this will require that the bars C C' be nearer or more distant from each other, in order properly to sustain the blank. I provide for this condition of things by having lines of holes in the sides of the frame into which dowels, pins, or screws K set from the ends of the cross-bars C.

When file-blanks such as are shown are to be ground it will be seen that, in order to have the surfaces to be ground set with even pressure against the stone, the lugs D of bar C' will have to set lower down than those of bar C, because the blank is thicker at the point nearest to C'. Therefore the set-screws F of bar C' will have to be let down or those of bar C screwed up.

It will be seen that numerous devices could be suggested for accomplishing the adjustment of these springs to any desired pressure upon the lugs. For instance, the screws F may be simple plain pins, fitting loosely into the holes beneath plates G, and a long bar can be set under all these pins, parallel to the cross-bars C or C', which, by having its ends simultaneously or evenly raised by means of set-screws or equivalent device, would force the pins F in, or let them come partially out, and so regulate the lugs D evenly. And instead of the lines of holes in the side of the frame a long open slot in each side may be substituted, and the ends of the cross-bars can be adjusted by means of a set-bolt or set-screw dropping into such long slots.

The manner of using this holder in connection with a grindstone is well known to those skilled in the art; but I will describe it.

An upright frame against which the holder is placed, and which holds it there, is set up in front of the working face of the stone. This frame has a slight lateral oscillating motion, and also a slow movement downward. I speak of an upright revolving stone. The holder containing the blanks to be ground is placed in or upon this frame, and the frame then commences its lateral oscillations and its slow movement downward. The frame carries the holder down in a plane tangential to the circular plane of the grinding-face of the stone, and the blanks come in contact with this face, and are ground evenly as they pass over it. The two motions—to wit, the lateral and downward—make the grinding of the blanks even instead of hollowing them out, which latter would be the case if the blanks were held stationary against the curved grinding-face.

Having thus described my invention, what I claim as new, and desire to secure by Letters Patent, is—

1. In a holder for grinding-machines, the combination, with each of the movable lugs D which sustain the blanks, of a spiral spring, E, set behind each lug, to raise the lugs and to force the blanks by a yielding pressure against the face of the stone, and a set-screw, F, operating to vary the tension of the spring, substantially as described.

2. In a holder for grinding-machines, the combination of cross-bars C C', lugs D, upon which the blanks rest, and a frame, A, to sustain said cross-bars, the said frame having a number of holes into which pins from the cross-bars set, whereby the latter are adjustable to grind blanks of various lengths, substantially as described.

JAMES JOWITT.

Witnesses:
   A. WEED,
   H. GOSLING.